United States Patent
Cunningham et al.

(10) Patent No.: US 6,754,621 B1
(45) Date of Patent: Jun. 22, 2004

(54) ASYNCHRONOUS HYPERTEXT MESSAGING SYSTEM AND METHOD

(76) Inventors: Andrew Cunningham, 83 Boundry Rd., West Bridgford, Nottingham (GB), NG2 7DB; Craig Hellon, 20 Highgrove Avenue, Chilwell, Nottingham (GB), NG9 4DN (*) Notice: Subject to any disclaimer, the term of this patent is extended or adjusted under 35 U.S.C. 154(b) by 667 days.

(21) Appl. No.: 09/684,309

(22) Filed: Oct. 6, 2000

(51) Int. Cl.[7] ............................................. G06F 15/16
(52) U.S. Cl. ..................... 704/219; 709/217; 709/227; 709/230
(58) Field of Search .............................. 709/217, 219, 709/227, 230–1, 232; 705/37

(56) References Cited

U.S. PATENT DOCUMENTS

| | | | | |
|---|---|---|---|---|
| 5,136,695 A | * | 8/1992 | Goldshlag et al. | 345/2.1 |
| 5,283,888 A | * | 2/1994 | Dao et al. | 709/237 |
| 6,260,148 B1 | * | 7/2001 | Aggarwal et al. | 713/201 |
| 6,408,282 B1 | * | 6/2002 | Buist | 705/37 |
| 6,631,415 B1 | * | 10/2003 | James et al. | 709/227 |

OTHER PUBLICATIONS

R. Fielding et al., "Hypertext Transfer PRotocol—HTTP/1.1",RFC 2068, http://www.cis.ohio-state,edu/cgi-bin/rfc/rfc/rfc2068.html Jan. 1997.*

* cited by examiner

*Primary Examiner*—David Wiley
*Assistant Examiner*—Joseph E. Avellino
(74) *Attorney, Agent, or Firm*—Bryan Cave LLP (57) ABSTRACT

An asynchronous hypertext messaging system and method are disclosed. The system and method use existing hypertext transfer protocols and is capable of transmitting real-time asynchronous data between server and client regardless of firewalls or proxy servers implemented at the client or the server. In a communication system comprising a client and server interconnected by an internet, initial authentication is performed initially between the server and the client. A secure log in is performed by the client with the server in conjunction with a possible java applet download. The communication server then initiates a multiplexed virtual connection between the server and the client and transmission of asynchronous real-time data can occur over the virtual connection. The virtual connection is periodically refreshed by a request issued from the java applet.

18 Claims, 6 Drawing Sheets

ASYNCHRONOUS HYPERTEXT MESSAGING SYSTEM AND METHOD

FIELD OF THE INVENTION

The present invention relates to electronic messaging methods and more particularly to asynchronous hypertext messaging between clients and servers with hypertext transfer protocol ("HTTP") capability.

BACKGROUND OF THE INVENTION

Electronic messaging methods are well known in the art and are an integral part of the suite of computer applications available to users of the internet. A common example of electronic messaging is instant messaging. However, for real-time information and data transmissions, instant messaging has significant drawbacks.

A popular application for instant messaging over the internet is the internet relay chat ("IRC") application, which is executed at a higher level protocol than the general internet transmission protocol, transmission control protocol/internet protocol ("TCP/IP"). IRC typically requires the client to execute IRC client software and connect to a specified IRC server where client to client real-time communication can occur. IRC client software typically utilizes a data destination port which is reserved only for IRC communications. However, gateway computers implemented for network security reasons, also known as "firewalls," typically do not enable the IRC port because of network security concerns. Firewalls are designed to limit the data traffic that may enter or leave a network to known protocols. That is, protocols that have been accepted as benign within a defined context are allowed to pass through the firewall to the network, while other protocols are prohibited from entering the client network. With the tremendous growth of the World Wide Web, and its attendant informational potential, the "web browsing" protocol, also known as hypertext transfer protocol ("HTTP"), is generally allowed to pass through firewalls without any modifications. IRC ports, on the other hand, have not generally been enabled on firewalls because of network security concerns.

Therefore, there is a need for an asynchronous real-time data or information delivery system which can use the standard HTTP protocol for the modern networked computing environment without compromising network security.

The present invention utilization of an asynchronous hypertext messaging system provides several major benefits. First, the present invention enables the server to force real-time updateable information, such as pricing information, supplied to the server from a resource, to computer workstations over the internet without polling during a given communication session. This is sent via a pseudo web browser pathway created between these computer workstations in response to an HTTP request for a large document created by active hypertext messaging conversion of messages generated from the computer workstations.

Second, all data transfers (messages) are encoded to appear as HTTP messages. The information is passed transparently through firewalls without the need for network security to be lowered.

Third, at the server end, the server is able to distinguish between the asynchronous hypertext messaging from standard HTTP requests. The server handles both standard web browser requests and asynchronous hypertext messages simultaneously. When a standard web browser request is submitted to the server, the request is forwarded to an available web server.

Fourth, asynchronous hypertext message encoding is efficient. Many logical data streams may be multiplexed onto a single asynchronous hypertext message stream. Optimization of server resources can occur by unloading the server of requirements for multiple simultaneous socket connections.

Finally, asynchronous hypertext messaging enables data encryption as specified by the server encryption components. Therefore, asynchronous hypertext messages can provide a permanent virtual connection via a HTTP proxy server or a secure HTTP proxy server without compromising the security model.

SUMMARY OF THE INVENTION

Broadly, in one aspect, this invention is a method of transmitting asynchronous hypertext messages from a server to a client interconnected by an internet, the method comprising the steps of transmitting a HTTP request identifying the client from the client to the server; initiating a virtual connection from the server to the client wherein the server transmits a HTTP header signifying a large HTML document and transmitting asynchronous hypertext messages encoded in the HTML document from the server to the client via the virtual connection wherein the virtual connection is maintained by periodically refreshing the HTML document at the client.

In another aspect, this invention is a trading instrument communication system for communicating trading information over an internet between computer workstations, the communication system comprising means for providing active hypertext messaging trading information between the computer workstations over the internet, the computer workstations being capable of generating messages, the hypertext messaging means comprising means for converting the messages to be transmitted over the internet; and means for transacting trades for designated trading instruments based on the communicated trading information.

In another aspect, this invention is a communication system for communicating real-time updateable information over the internet between computer workstations without polling, the communication system comprising means for providing active hypertext messaging information between the computer workstations over the internet, the computer workstations being capable of generating a real time message, the active hypertext messaging means comprising means for converting the generated message into a pseudo HTTP browser type message for transmission over the internet; server means disposed between the computer workstations and connectable thereto over the internet; and means for supplying the real time updateable information to the server means during a communication session, the server means comprising means for creating a pseudo large document message pathway between at least a pair of the computer workstations in response to the pseudo HTTP browser type message for enabling the real time updateable information supplied to the server means to be communicated to the pair of computer workstations over the pathway without polling during the communication session.

Other features and advantages of this invention will be apparent to those skilled in the art from this disclosure.

BRIEF DESCRIPTION OF THE DRAWINGS

A more complete understanding of the present invention may be obtained by considering the following description in conjunction with the drawings in which.

DETAILED DESCRIPTION OF THE PREFERRED EMBODIMENT

The asynchronous hypertext messaging system and method of the present invention uses existing hypertext transfer protocols to provide a real-time interactive messaging system which can tunnel through firewalls.

Hypertext transfer protocol ("HTTP") is a well known application-level protocol for distributed, collaborative, hypermedia information systems. At the heart of HTTP is a generic, stateless request and response protocol controlled typically by web browser software at the client and by web servers at the server. For example, when a web browser implemented on a client requests information from a web server implemented on a remote server, the web server subsequently responds to the request with the requested information.

Figure 1:
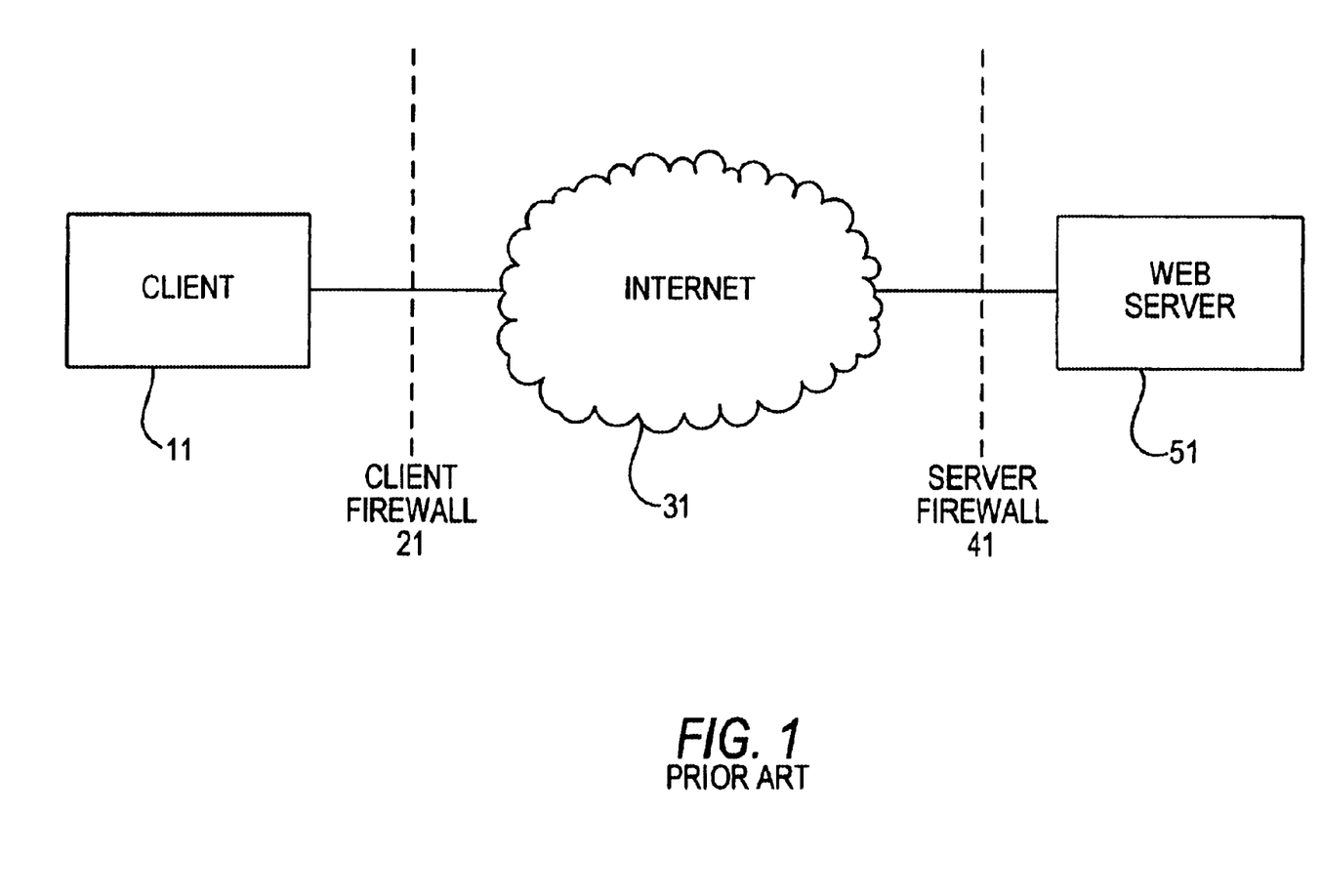
FIG. 1 is a schematic diagram of a conventional internet interconnection between a server and a client.

Referring now to the drawings in detail, and initially to FIG. 1, application of the present invention will be illustrated with respect to a schematic diagram of a conventional internet connection between a server and a client. A client 11 is typically connected to the internet 31 through a client firewall 21. A web server 51 is similarly connected to the internet 31 through a server firewall 41. For purposes of illustration, a single client and a single server are illustrated herein. However, it will be apparent to one of ordinary skill in the art that there are a plurality of servers and clients interconnected to the internet and the present invention is not limited to a single client and a single server.

For purposes of this application, the client 11 is representative of a single terminal, a computer workstation, a personal computer or, more generally, a network of computers. The client may also be representative of a local area network. Similarly, the server is representative of a single web server or a plurality of clustered web servers capable of delivering documents via the conventional HTTP protocol. The client firewall 21 is typically a separate computer which acts as a gateway computer and acts to virtually isolate the users of the clients from the internet or other external networks. For purposes of this application, the firewall is representative of proxy servers or any other conventional network security measures implemented at the perimeter of a network. Within the security perimeter of the firewall, users may be able to communicate freely. However, all messages sent to or from users outside the client must pass through the firewall computer, or set of computers, which will check, route, and frequently label all information that passes through it. A firewall can be a conventional computer running specific firewall software, or a dedicated computer device specifically constructed or configured as a firewall. The firewall can be dedicated solely to performing the firewall functions, or it can also perform additional functions such as packet routing, in addition to its firewall functions. Such firewalls will block data packets according to specific sets of predetermined rules programmed into the firewall.

The server firewall 41 is implemented in similar fashion to the client firewall at the web server 51. Thus, the server firewall 41 is typically a separate computer which acts as a gateway computer and acts to virtually isolate the servers from the internet or other external networks. As with the client firewall 21, within the security perimeter of the firewall, servers may be able to communicate freely. However, all messages sent to or from users outside the server must pass through the firewall computer, or set of computers, which will check, route, and frequently label all information that passes through it. As noted above, a firewall can be a conventional computer running specific firewall software, or a dedicated computer device specifically constructed or configured as a firewall. The firewall can be dedicated solely to performing the firewall functions, or it can also perform additional functions such as packet routing, in addition to its firewall functions. Such firewalls will block data packets according to specific sets of predetermined rules programmed into the firewall. The server firewall 41 typically allows HTTP requests from other components of the internet to pass through transparently to the web server while blocking other types of data packets.

In the conventional system of FIG. 1, the standard method for reliable communication between an application residing at the client and an application (or information) residing at the server is the well known TCP/IP protocol. The TCP/IP connection appears to each of the client and the server as a "socket," and each exposes a "port" for the proper data communication between the applications.

However, a typical client firewall 21 is configured so that restrictions are placed on many of the ports used for proper data communication. A HTTP request, however, is considered benign and is generally passed through to the internet. As long as HTTP requests are initiated from the client, resulting HTTP responses are conventionally given a defined dedicated path back to the client. Accordingly, the real-time interactive communication methodology of the present invention encompasses the HTTP protocol in order for the firewalls to be effective in their default configuration.

There is a prior art solution for delivering real-time data to a client within the HTTP protocol although such solution is not satisfactory due to the need for continuous polling. Accordingly, in such a prior art solution, software resident on the web page at the web server may force the client software (such as a browser) to continually poll, or refresh, the HTTP request so that the latest information is delivered to the client. Alternatively, software resident on the client may continually poll the web server. However, these approaches have severe limitations. For instance, data or information to be sent to the client must be classified with certain polling intervals. For example, if the data consists of a securities price which must be transmitted to the client within a five second time frame, it may be necessary for the client to request an update from the server once every second to keep the latency to a minimum. This would generate a huge amount of traffic overhead and become impractical for large scale implementations. The polling interval can range from a few seconds (for example, stock or commodity prices) to hours (for example, the price of durable goods at a wholesale oriented website). On the one extreme, a few second polling interval can generate enormous amounts of data traffic for a network of modest size and can generate an enormous amount of overhead which make it impractical for any substantially large scale implementation of real-time data. At the other extreme, the polling interval can become so long that the data or information can no longer be termed real-time.

Figure 2:
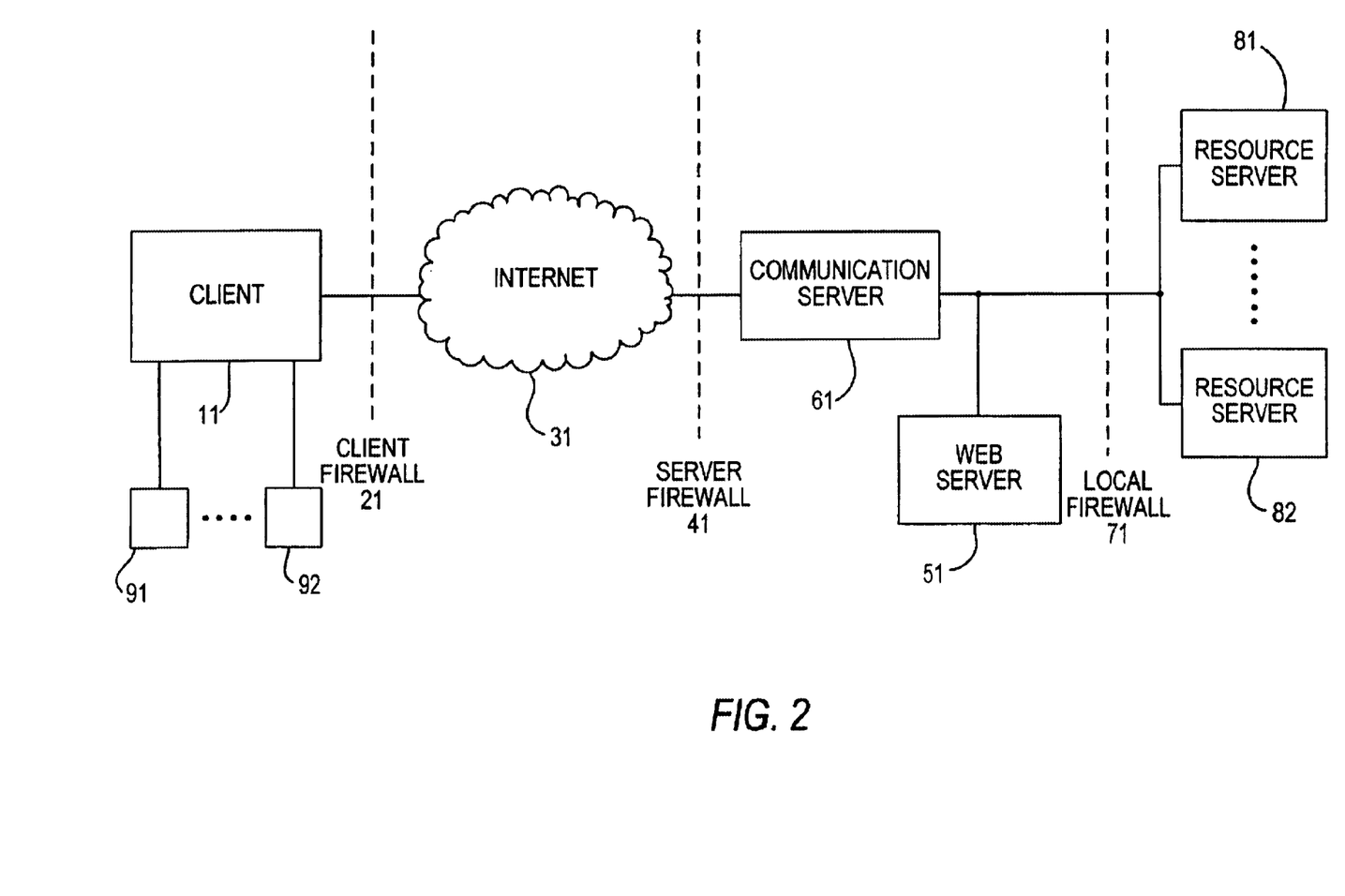
FIG. 2 is a schematic diagram of a connection between the client and the server in accordance with the principles of the present invention.

A more efficient solution which overcomes the unsatisfactory problems created by polling is illustrated in the present invention. Referring now to FIG. 2, there is shown an asynchronous hypertext messaging system in accordance with the principles of the present invention. A client 11 is connected to the internet 31 through the client firewall 21. The client 11 is further connected to consumers 91, 92. For purposes of this application, consumers 91, 92 and client 11 are interchangeable and are shown in the figure merely to be representative of an private network configured within the perimeters of the client firewall 21. A communication server 61 is connected to the internet 31 through the server firewall 41. The web server 51 is subsequently connected to the communication server 61. A plurality of resource servers 81, 82 are connected to the communication server 61 through a local firewall 71. It should be noted that the communication server 61, web server 51, and resource server 81, 82 may all be installed on a single computer partitioned in a conventional way.

The communication server 61 may be generally implemented as a computer with dedicated software devoted to the delivery of real-time data. The resource servers 81, 82 may be generally implemented as a computer with dedicated software providing the source of real-time data to be routed to clients. The resource servers 81, 82 may be dedicated to delivering various types of real-time data to the client. For example, the resource servers may deliver any real-time updateable information, such as real-time pricing information, such as stock prices, or other real-time data such as foreign exchange quotes, bidder and seller information for capital market transactions, etc. In a preferred embodiment, the resource servers 81, 82 deliver real-time data asynchronously. That is, the resource servers deliver data only if the data has changed, or needs to be refreshed. It should be noted that the various firewalls 21, 41 and 71, are similar in operation to those described above. The web server 51 may be a separate computer dedicated to delivering web pages and is, significantly, connected to the communication server 61.

It can be readily seen from FIG. 2 that the communication server 61 serves as a convenient access point to combine many server functions. For instance, the communication server 61 is able to provide support for real-time communications that may not be HTTP based but have similar requirements. For example, the communication server 61 may provide real-time delivery of data and information to facilities including raw TCP/IP sockets routed across an intranet, the internet or a virtual private network.

Figure 3:
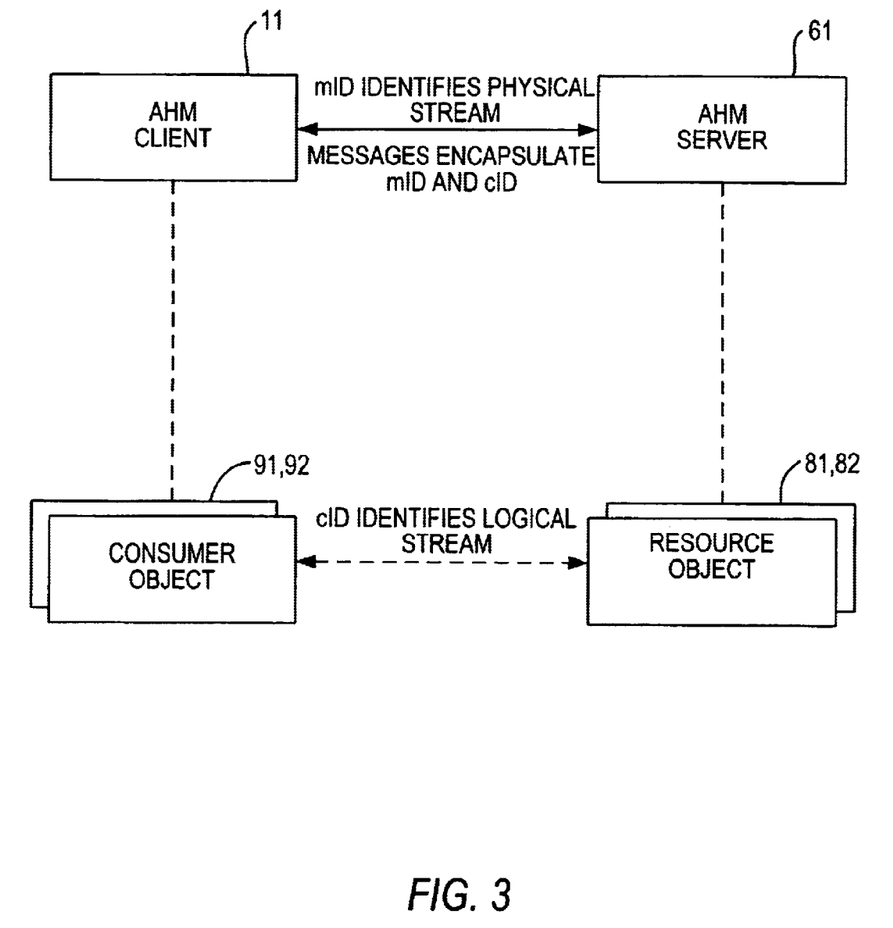
FIG. 3 is a schematic diagram illustrating the multiplexing of multiple logic streams between objects in accordance with the principles of the present invention.

In practical systems, there are often limitations on facilities that the network can make available to an application. The network facilities include entities that are often required to support communications such as file descriptors and TCP ephemeral ports. By multiplexing several logical communication streams onto a single physical transport stream it is possible to reduce the impact on system resources. In other words, great system benefits are achieved when a single client instance can support multiple client side objects that can communicate over a single physical stream with multiple server side objects that are supported by a single AHM server instance. A practical implementation of this within the asynchronous hypertext messaging system of the present invention is enabled by automatically allocating multiplexing identifiers to the communications logic. Two main identifiers are used. Referring to FIG. 3, the first identifier is known as the multiplex ID ("mID") and is allocated to each physical communication stream between a communication server 61 and a single client 11. The mID is unique within a single communication server instance. Referring again to FIG. 3, the second identifier is allocated to each logical stream between a client side consumer object 91, 92 and a server side resource object 81, 82. This identifier is known as the Consumer ID ("cID") and is appended to any communication message that is associated with the object that initiated the logical stream. A cID is unique within the context of the physical stream identified by a single mID.

It is additionally noted that any HTTP requests transmitted from the client 11 to the communication server 61 that are not associated with asynchronous hypertext messaging are directed to an appropriate web server 51 and resulting web server responses are relayed to the requesting client 11. In an alternative embodiment, relayed requests and responses by the communication server 61 are translated to enable appropriate mapping of the web site universal resource location ("URL"). This is especially useful where external entities expect to receive URLs that match specific constraints.

Figure 4:
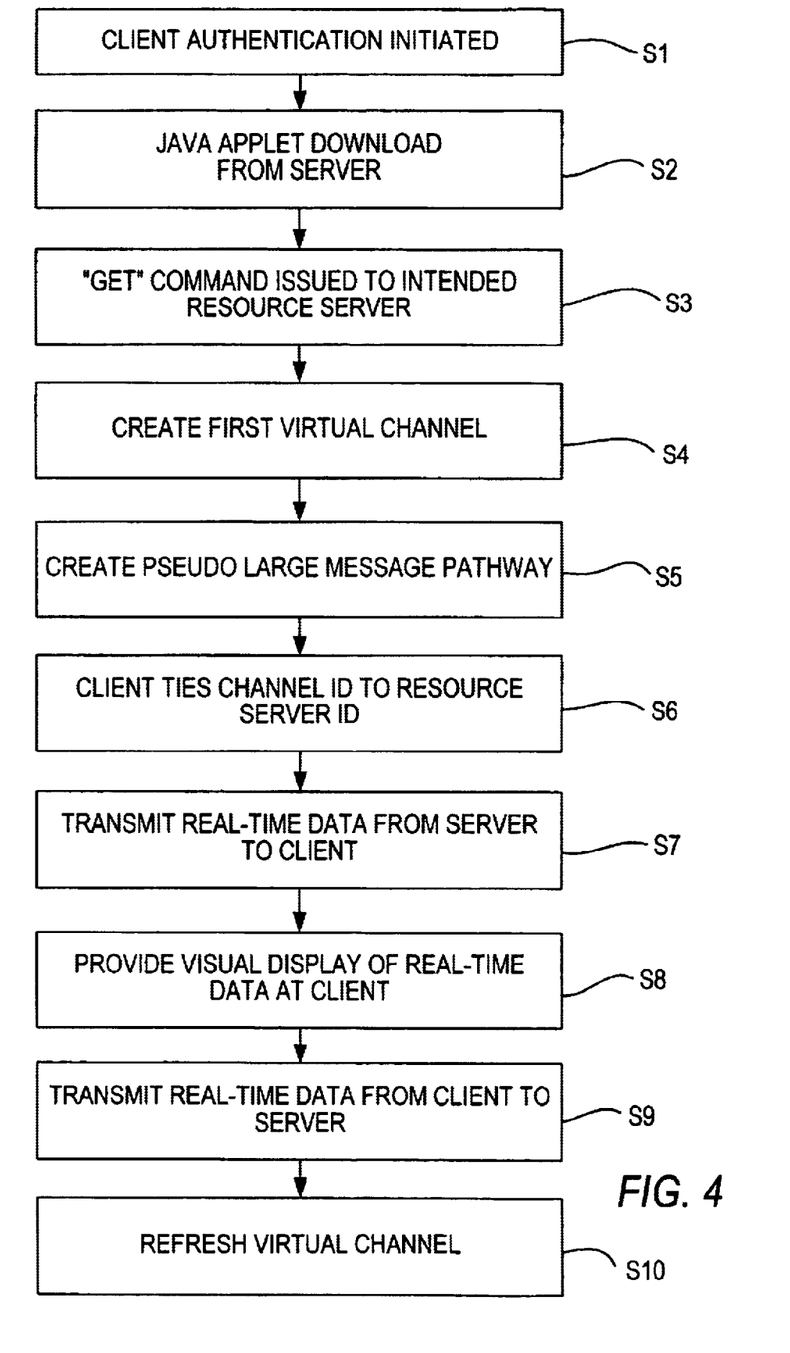
FIG. 4 is a flowchart illustrating the detailed steps of asynchronous hypertext messaging in accordance with the principles of the present invention.

Referring now to FIG. 4, there is shown a flowchart diagram of the steps of the asynchronous hypertext messaging method of the present invention. At step S1, the step of authentication is initiated, typically by the client. A client initiated request is transmitted by a web browser located at the client directed to the web site URL of the website containing the communication server 61 (e.g., "HTTP://www.xxx.yyy"). The communication server 61 would, at some point prior to the download of sensitive data, subsequently respond to the client initiated request by requesting client authentication. The authentication step can be performed through the basic authentication access scheme conventionally built into any HTTP-based website. In a preferred embodiment, the authentication step is performed through the well known secure socket layer ("SSL") protocol, to provide a higher level of authentication and certification.

At step S2 the client requests a java applet download from the web server 51. The communication server 61 translates the HTTP request as a true HTTP request and relays the HTTP request to the web server 51. The web server 51 provides a response to the client web browser which includes the java applet download. In an alternative embodiment, the applet is pre-installed onto the client browser and appropriate commands are conventionally issued to initiate the java applet.

At step S3, the client indicates the desire to log in to a resource server 81, 82 for secure real-time communication. The java applet subsequently issues a "GET" command 20 to the communication server 61 so that the communication server is notified of the intended resource server 81, 82. An example of the HTTP command issued by the java applet is:

GET/<AHMString>/login.html?script=<scriptURL>

The <AHMString> field indicates to the communication server 61 that the command is an asynchronous hypertext messaging command to be handled by the communication server 61. At this point, a pseudo HTTP browser message has been created for enabling the messages from the computer workstation 11 to be transmitted over the internet 31. It should be noted that other additional parameters may similarly be passed to the communication server 61 with additional identification information so that client authentication and client certification can be further performed.

At step S4, the first multiplexed virtual channel connection is initiated. A "GET" command is again issued to the communication server 61 so that the communication server may transmit subsequent asynchronous messages to the client 11. An example of the HTTP command issued by the java applet is:

GET/<AHMString>/<mID>/<encrypting>/<scsID>/mux.html where the <mID> is the multiplex channel identification number and the <scsID> is the communication server 61 identification number. The file "mux.html" does not exist and the file name is merely an indication that the communication server 61 must service the function. <scsID> and <mID> are zero if the secure log in step has not been executed and the client 11 will obtain the <scsID> and <mID> of the new connection when the server sends its response to the HTTP get command. Otherwise, the scsID and the mID have values returned during the secure log in phase.

At step S5, the communication server 61 receives a multiplexed channel creation request and returns an HTTP response header. The response header indicates that the communication server 61 is set to transmit that virtual document (mux.html in this case) to the client 11 and that the document is very large. Appendix A contains exemplary code for the communication server 61 to transmit to signal to the client 11 that the document is to be a very large document. This creates a pseudo large document message pathway between the communication server 61 and the computer workstation 11. The response header conventionally readies the web browser at the client 11 for what is expected to be a large document so that the web browser connection is maintained throughout the transmission or communication session. The first few bytes of the response body is sent by the server. An example of the format of the body message to be sent by the communication server is:

<scsID>/<mID>

It should be noted that the virtual connection or pseudo web browser message pathway is conventionally kept open by the client web browser expecting to receive the remaining large document, mux.html. Therefore, a channel is formed along which asynchronous messages may be transmitted from the communication server 61 to the client 11. Of course, in accordance with the present invention, no actual large document exists, Instead, with the present invention, the web browser is "fooled" into keeping the pathway open and enables the communication server 61 to push or force real-time updateable information supplied from the communication server to the computer workstation over the pathway without polling.

At step S6, the client java applet creates a unique ID identifying a specific resource server 81, 82 with a <cID>, a channel identification number. An example of an HTTP message sent from the client java applet is:

POST/<AHMString>/<resource>/<mID>/<cID>/<scsID>/new.html

In response to the request, the communication server 61 transmits a short HTTP response indicating successful establishment of the channel by returning the <cID>. The virtual channel has been created for the transmission of real-time data sent asynchronously to the client 11.

At step S7, the resource servers 81, 82 asynchronously send real-time data to the client 11. Real-time data is transmitted to the client along the multiplexed connection in the form of an HTTP message such as:

<message ID>/<cID>/<message>

It must be noted that the <message> must be encoded in a form that would be part of an acceptable payload of an HTML document. That is, the payload should be encoded so that the firewall 21, 41, 71 is fooled into believing that the message is part of an HTML document.

At step S8, the client java applet receives asynchronous real-time data from the multiplexed connection and passes the data to the logical client indicated by the <cID>. At this point, the java applet may format the real-time data and provide a visual display of the real-time data to the user of the computer workstation 11. Alternatively, the java applet may be conventionally modified to display the real-time data in a scrolling stock ticker display window at the computer workstation 11.

At step S9, the client java applet can asynchronously send real-time data to the server-side resource 81, 82. The client java applet can send a command in the form of:

POST<AHMString>/<resource>/<mID>/<cID>/<count>/close.html where <resource> is the target resource server 81, 82. At the communication server 61, the communication server 61 reorders received messages as necessary based upon the count parameters specified in <count>. Outstanding messages are passed to the specific resource server. The server subsequently transmits a success flag to the client as the HTTP response message and closes the connection.

Typical web browsers feature time-out provisions to close HTTP connections when the web servers do not respond after a prespecified time interval. To prevent the connection from being closed by the web browser software or the firewall 21, 41, 71 due to possible gaps between real-time data transmission from the resource server 81, 82, in step S10, a refresh command is issued by the client java applet. The client java applet issues a command in the form of:

GET/<AHMString>/<mID>/<scsID>/refresh.html

When the communication server 61 receives the refresh command, the communication server returns a new HTTP header message to the client 11 indicating a new virtual document. A new virtual connection is therefore established with further asynchronous messages transmitted along the new virtual channel.

Referring now to Table 1, the above described procedure is detailed with specific implementation details. Table 1 is organized so that column 1 specifies client initiated processes, column 2 specifies server initiated processes and column 3 illustrates specific comments and notes based on each process. It is noted that, for purposes of this application, active hypertext messaging and asynchronous hypertext messaging are interchangeable.

TABLE 1

| Client Initiated Messaging and Processing | Communication Server Initiated Messages and Processing | Explanation and Notes |
|---|---|---|
| SSL (Secure Socket Layer) challenge and negotiation of key(s). This will generally occur due to standard website access using the HTTPS protocol specifier. | | Alternative Embodiment - It would be normal for a specified form of client authentication to take place at this point, often based on the client certificate technology. |
| Client requests java applet download. | | |
| | Server detects that AHMstring is not present in the client download request and is thus a 'true' HTTP request for a document. The server relays the request to an attendant web server. | Note 1: AHMstring represents a string that it is guaranteed will only occur within an AHM message and is not mapped onto an actual web folder name associated with the hosting domain. Note 2: Optionally the server may translate the domain name in the request to that of the web server. This applies to any request that the communication server forwards to the web server. |
| | Web server provides response which includes applet download. The response from the web server is relayed by the communication server to the client that originated the request. | Optionally the communication server may translate the domain name in the header of the web server response to the one that corresponds to the machine that the communication server is hosted on, before forwarding the response on to the client. This applies to any response that the communication server receives from the web server. |
| Secure Login | | Alternative Embodiment - Enables the communication server to authenticate the client using a methodology that exists outside of the AHM session. This might include LDAP compliant database lookups driven by secure cookie or client certificate information. |
| Client indicates future desire to login to a resource that requires secure real time communications. AHM issues the HTTP command: GET /<AHMstring>/login.html?script=<scriptURL> | | |
| | Server detects AHM login request and runs the specified script on the attendant web server. Optionally the communication server would extract client certificate information from the client and attach that to the script request that is sent on to the web server. The web server runs the script to achieve authentication. The script action is entirely flexible and is beyond the scope of this example. | The login command may optionally contain further arguments that correspond to additional identification information that the client should make available to the script. |
| | Script returns results to communication server, the communication server forwards these to the requesting client. The return body would include: <mID>,<scsID><session key>,<username>,<password> | mID is the unique identifier created by the communication server identifying this multiplexed channel that will be used for this session. scsID is a hard coded unique ID identifying the communication server that returned the message. In a multiple communication server installation it will be necessary that the session between client and a given communication server is |

TABLE 1-continued

| Client Initiated Messaging and Processing | Communication Server Initiated Messages and Processing | Explanation and Notes |
|---|---|---|
| | | 'sticky'. That is, communications from a client will continue to be directed at the communication server with the specified scsID. This stickiness would normally be provided by standard IP load balancing equipment, but the scsID allows AHM to determine that the required session memory is working correctly and not timing out too quickly.<br>session key is a symmetric key that can be used to further encrypt all subsequent communications in this session.<br>username and password may be returned by the script to allow the client to login to other secure resources within this AHM session. |
| Create the first multiplexed channel connection. This will be kept open for a defined period of time to allow the server to send communications asynchronously to the client | | |
| Client creates initial mux connection. AHM issues the HTTP command:<br>GET<br>/<AHMString>/<mID><br>/<encrypting>/<scsID><br>/mux.html | | Note that mux.html does not exist. This file name is merely an indication to the server side AHM of the action that is required.<br>scsID and mID are zero if the Secure Login phase has not been carried out and the client will obtain the scsID and the mID of the new connection when the server sends its response. Otherwise scsID and mID have the values that were returned during the Secure Login phase.<br>If encrypting is non-zero this indicates that the channel must be encrypted using a pre-arranged key. In this case where mID is non-zero the <session key> returned by that Secure Login phase will be used. If mID is zero then the secure login will not have taken place and a fixed hard coded key will be used for the encryption. Note that this encryption is in addition to any encryption that is already present in the channel by virtue of using a protocol such as HTTPS (HTTP over SSL).<br>encrypting will be zero if no encryption over and above the standard channel encryption is required. |
| | Server side AHM receives mux creation request and returns an HTTP response header. The header indicates that the server is going to send the virtual document, mux.html, to the client and that the document is very large.<br>The first few bytes of the response body sent by the server are:<br><scsID>/<mID><br>The connection is kept open by virtue of the fact that the client expects to receive the remainder of the large document mux.html. This forms the channel along which further server to client | The scsID when received by AHM at the server is only used to check that third party state aware IP load balancing is working correctly. |

TABLE 1-continued

| Client Initiated Messaging and Processing | Communication Server Initiated Messages and Processing | Explanation and Notes |
| --- | --- | --- |
| | messages are sent as required. | |
| Open a Virtual Connection to a Specific Resource | | The mux connection between the communication server and the client is already open. However, it is desired that the communication server multiplexes various logical communication streams between the client side consumers and back end resources over the same mux connection. |
| Client side AHM creates a unique ID that identifies a specific logical connection between a client side consumer and a desired server side resource. This identifier is known as the cID. Client side AHM sends HTTP message: POST /<AHMstring>/<resource>/<mID>/<cID>/<scsID>/new.html | | The cID is only required to be unique within the context of a specific mID. The resource string enables the AHM client to specify by name a specific server side service that the logical consumer connection should be made to. The scsID is the value that was returned during creation of the multiplex connection. It is only used to check that third party state aware IP load balancing is working correctly. new.html does not exist. This file name is merely an indication to the server side AHM of the action that is required. |
| | The server side AHM sends a very short HTTP response that indicates success by returning the cID. | At this point the response body is complete and both server and consumer close the physical connection that was created by this request. Data is transferred from server to client using the mux connection as described below. |
| | Server Side Resource Asynchronously Sends Real Time Data to Client Consumer | It is to be noted that communication between a consumer and resource is full duplex and message sending may take place at any time. |
| | Data is sent from server to client along the mux connection in the form: <messageID>/<cID>/<message> | <message> must be encoded into a form that would be an acceptable payload of an HTML document response. It must be remembered that the communications infrastructure must believe that data being sent is part of mux.html or refresh.html. |
| Client receives data from mux connection and passes to logical consumer indicated by <cID> | | Note that unless the server is configured to do duplicate sends of messages, the transport protocol would normally ensure that the messages sent from server to client will be ordered correctly and not duplicated rendering the messageID unnecessary. |
| Client Consumer Asynchronously Transmits Real Time Data to Server Side Resource | | It is noted that communication between a consumer and resource is full duplex and message transmission may take place at any time. |
| Client side AHM receives a message from the client side consumer and encodes it into an appropriate form such that it can be the body of an HTTP POST command. Client side AHM sends the command: | | <resource> is the target resource. This value is optional; the cID is associated with a specific resource through the Open A Virtual Connection To A Specific Resource phase. The count is incremented by AHM on each message that is sent within a consumer to resource session identified with a single cID. |

TABLE 1-continued

| Client Initiated Messaging and Processing | Communication Server Initiated Messages and Processing | Explanation and Notes |
|---|---|---|
| POST /<AHMstring>/<resource>/<mID>/<cID>/<count>/data.html <message> | | |
| | The server reorders received messages as necessary based upon the count parameter. Messages are passed to the specified resource. The server send a success flag to the client as the HTTP response message and closes the connection. | It is possible for messages to arrive out of sequence if HTTP keep alive is not supported on the connection. |
| Client receives HTTP response, throws it away, and closes the connection. | | |
| MUX Refresh Request | | In order to stop a connection going stale it is essential that from time to time the client side AHM creates a new mux connection and closes the old one when all pending data has been received. This is required to stop web browsers, proxy servers, etc. from closing down the connection. There are a number of entities that might close down a connection if a complete page hasn't been successfully downloaded within a certain time period. |
| Client AHM creates request for replacement mux connection. AHM issues the HTTP command: GET /<AHMString>/<mID>/<scsID>/refresh.html | | |
| | Server side AHM receives mux refresh request and returns an HTTP response header. The header indicates that the server is going to send the virtual document, refresh.html, to the client and that the document is very large. The connection is kept open by virtue of the fact that the client expects to receive the remainder of the large document refresh.html. This forms the channel along which further server to client messages are sent as required. Having opened the new mux channel the server closes the old mux channel. | Asynchronously closing the old mux channel at the server end does not result in loss of data. It does not stop the client reading the data that has recently been sent to it over the mux connection but has not yet been received. |
| Once the client AHM has read all information from the old mux connection the client closes it. The client AHM will then start to read from the new mux connection. | | |
| Client Consumer Close Request The consumer wishes to close the connection. Client side AHM sends the command: | | <resource> is the target resource. This value is optional; the cID is associated with a specific resource through the Open A Virtual |

TABLE 1-continued

| Client Initiated Messaging and Processing | Communication Server Initiated Messages and Processing | Explanation and Notes |
|---|---|---|
| POST /<AHMstring>/<resource>/<mID>/<cID>/<count>/close.html | | Connection To A Specific Resource phase. The count is incremented by AHM on each message that is sent within a consumer to resource session identified with a single cID. |
| | The server reorders received messages as necessary based upon the count parameter. Previous outstanding messages are passed to the specified resource. The server sends a success flag to the client as the HTTP response message and closes the connection. | It is possible for messages to arrive out of sequence if HTTP keep alive is not supported on the connection. |
| Client receives HTTP response, throws it away, and closes the connection. | | |
| Server Resource Close Message | | The resource may close the connection asynchronously |
| | The server AHM embeds a unique close message and <cID> in the stream of data being sent down the mux connection. | |
| The client receives the close message and closes the connection. | | |

Figure 5:
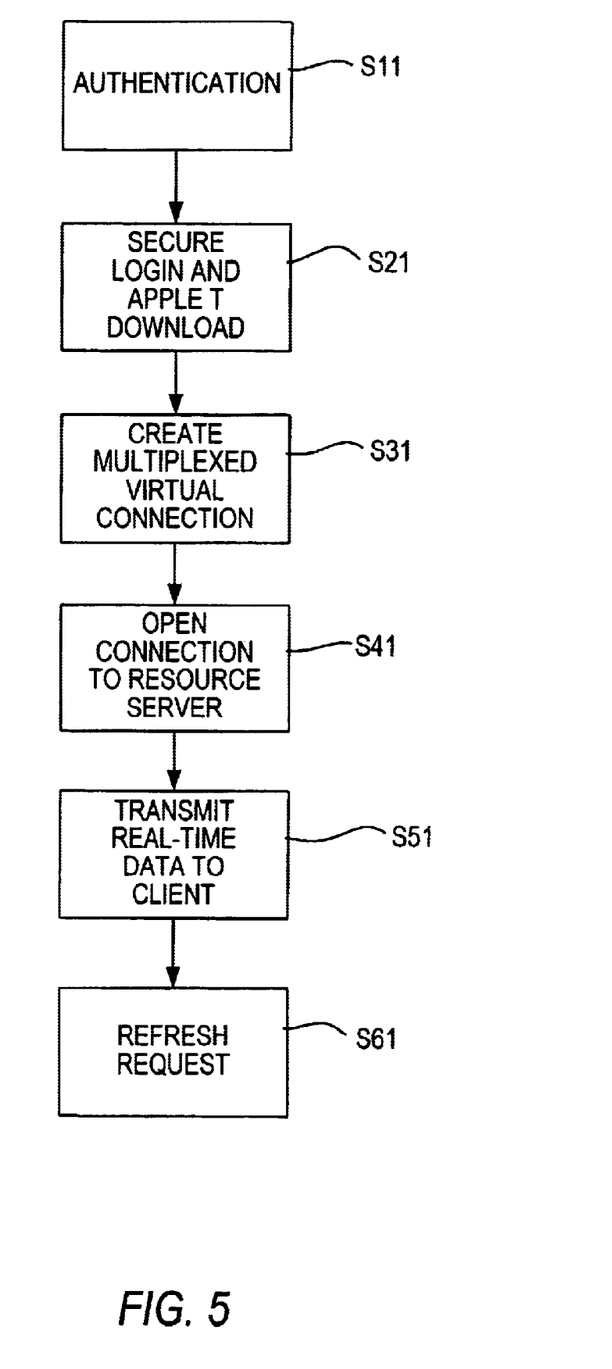
FIG. 5 is a flowchart illustrating the broad steps of the asynchronous hypertext messaging in accordance with the principles of the present invention.

Referring now to FIG. 5, the above described procedure can be summarized as follows. At step S11, initial authentication is performed between the communication server 61 and the client 11. At step S21, a secure log in is performed by the client 11 with the communication server 61 in conjunction with a possible java applet download. At step S31, the communication server 61 initiates a multiplexed virtual connection between the communication server 61 and the client 11. At step S41, the virtual connection is open to the resource servers 81, 82. At step S51, transmission of asynchronous real-time updateable data can occur over the virtual channel. At step S61, the connection is periodically refreshed by a request issued from the java applet.

In a preferred embodiment, the communication server 61 implements a "heartbeat" mechanism. It is a common requirement that a system that requires real time communication will also need an early indication if excessive delays are being incurred between sending and receipt of messages. However, a reliable transport protocol such as TCP may continue to attempt to re-send segments of information under failure conditions for several hours without alerting the application that sent the information. Thus, to enable appropriate action to be taken under failure conditions a best implementation of asynchronous hypertext messaging includes a "heartbeat" mechanism. A regular heartbeat message is sent at a configurable interval from the communication server 61 to the client 11. Alternatively, the heartbeat need not be sent if other valid data is sent. If the client 11 does not receive a heartbeat (or optionally some other valid data) after a configurable number of heartbeat intervals then the client consumer is warned. Alternatively, a second configurable threshold of a greater number of heartbeat intervals may be set. If no heartbeats are received during a period equivalent to this second threshold then the physical communication stream is dropped. This second threshold is useful in circumstances where the system designer is sensitive to the possibility of a large number of "stale" connections being used to create a "Denial Of Service" scenario. An alternative refinement of the heartbeat methodology is obtained where the entity that sends the heartbeat includes the set heartbeat interval within the heartbeat message. This allows the entities to automatically synchronize their heartbeat settings, avoiding problems caused by misconfiguration.

Additional reliability can be achieved under certain circumstances by creating multiple physical streams and sending duplicate data. In this alternative embodiment, the sender (either the client 11 or the communication server 61) attaches a unique identifier to each message that is sent. The relationship between identifiers on successive messages must be known to both sender and receiver (for example incrementing the identifier by one on each message, within a defined modulus). The receiver then is able to quietly drop messages that have the same identifier as messages that have already been received. It is also necessary for the receiver to be able to reorder received messages into the correct order before forwarding them to the appropriate resource server or consumer.

It is additionally noted that the client 11 and communication server 61 are able to determine several metrics which give an indication of the performance of the physical communication stream. These metrics can be based on a number of parameters including the time required to perform a refresh request, the delay of heartbeats, the variation of the delays from time to time, etc. These metrics may be passed to the consumer or resource server, sent to a system monitoring entity, and used as the basis for automatic route selection. In addition the metrics may be used to trigger changes in the operation of the system such as instigating "multiple send" or "automatic route selection."

With a system monitoring entity, in certain operational environments there may be several accessible routers available for TCP/IP based communication. In a preferred embodiment, a communication server 61 allows the server or the client to select, in real time, the most appropriate next hop to send messages. The criteria for the routing decision may be based on type of service (such as large non-delay sensitive messages vs. smaller delay sensitive messages) or based upon measurements obtained through real time connection monitoring. This functionality allows intelligent routing to take place based upon HTTP protocol performance as opposed to the underlying TCP/IP performance. A typical application may be where connections are available to two Internet Service Providers ("ISPs") and that real time HTTP performance to a given customer is significantly better through one ISP than the other. Or if a private wire is dedicated to the connection but a problem occurs that renders it unavailable the information may be temporarily switched to an internet based route.

It must be noted that automatic route selection can still be used where the client is implemented as an unsigned Java applet (thus having the restriction that it can only communicate with the IP address from which it was downloaded). This can be achieved by specifying to the client that it should indicate its route selection by means of destination port rather than IP address. The conventional gateway router can then make a next hop routing decision based upon the specified layer 4 port, rather than the layer 3 IP address. Most TCP/IP capable routers support this functionality.

In regards to security issues for the real-time data, there are a number of methodologies which may be employed to encrypt the data. One methodology is using HTTP over Secure Socket Layer ("HTTPS"). A link will be encrypted using a symmetric key that has been created securely using the trusted asymmetric key in the SSL X509 certificate based methodology. A more secure link can be created by using HTTPS plus additional key Methodology. After the HTTPS link has been created, the communication server creates a new symmetric key on the fly. This key is securely passed to the client using the HTTPS link. Client and Server communications within the session are, from then on, encrypted with the new key. These encrypted messages are then further encrypted as they are passed across the HTTPS channel. An alternative encryption methodology is HTTPS followed by additional key on HTTP. The methodology utilizes the same procedure as for HTTPS plus additional key except that the link operates wholly or partly across an HTTP link rather than an HTTPS one. Thus the AHM generated symmetric key is passed back to the client across an HTTPS connection, but the main communications take place across an HTTP connection encrypted only with the AHM generated key. An alternative encryption methodology is HTTPS followed by additional key on raw TCP/IP socket. This methodology is identical to the aforementioned HTTPS followed by additional key on HTTP, except that after the client has received the server generated key, further communications take place over a standard TCP/IP socket.

With respect to authentication, it is noted that additional authentication, if desired, is possible between the server and the client. Either in conjunction with a simple user id/password scheme, or instead of, the client can indicate that additional authentication scripts must be run. Such a script would normally inspect a previously authenticated client identifying token such as a client certificate or a previously placed secure cookie. As a result of running the script, the communication server would return information such as an mID to identify the physical connection, a user id/password pair, and optionally an additional key to further encrypt the channel.

There are several ways that authentication can be achieved in a practical implementation. In one embodiment, the client is allowed to communicate directly with a secure web server (normally this would be an HTTPS connection). The secure web server obtains the client token and runs the script, returning the results directly to the client. It is necessary for the script to communicate with the server side component to obtain an identifier for the physical stream (the mID).

In a second embodiment, the client communicates only with the server side component incorporated within the communication server. All HTTPS requests/responses that the communication server receives are decrypted/encrypted by the communication server. Therefore, all true HTTPS requests received by the communication server are relayed to/from the associated web server in unencrypted, HTTP form. Thus although communication between the communication server and the client would typically be HTTPS listened for by the communication server on the well known HTTPS port 443, the request for applet download and other true browser requests would typically be relayed on to a web server listening on the well known HTTP port 80. Therefore, the web server will not receive the client's token such as certificate details directly. However the communication server will receive the token details and is able to make those details available to an external process. This could be made available as environment variables, or more efficiently, the communication server posts client token information to the attendant web server as part of the process of relaying on the script that has been indicated by the client. The token information can be appended by the communication server to the HTTP script call as either part of an HTTP GET command or as part of an HTTP POST command. In either case, the script which is run by the web server can easily access this information to perform the required processing. In this way, standard web server scripting/plugin methodologies can be used.

In a third embodiment, the client communicates only with the server side component incorporated within the communication server. The communication server shares a server certificate with the web server. Only HTTPS client requests/responses that are tunneled communications to/from server side resources are decrypted/encrypted by the communication server. Thus all true HTTPS requests received by the communication server are relayed to/from the associated web server in encrypted, HTTPS form. Therefore, the web server will receive the client's token such as certificate details directly. The web server can run the required authentication script and the communication server relays the results back to the client.

It should be noted that a server side asynchronous hypertext messaging implementation encapsulated within a communication server would provide the means to authenticate a user on the basis of the source IP address of the received connection. Resource servers can then expose access control lists based upon IP addresses and IP address ranges that indicate connections that they would allow or deny, possibly pending additional authentication criteria.

In the system of the present invention, the communication server may act as a "proxy consumer" on behalf of remote applets or applications that wish to access server side resources. Generally, security requirements dictate that no remote entity may communicate directly with sensitive server side resources. The proxy consumer functionality provides a secure way of enabling remote objects to consume server side resources. In addition, proxy consumer capability can be achieved without the client consumer requiring any knowledge of the actual location of the server side resources—the client only needs to know the location of the communication server. Further, it is possible for requests from multiple consumers to be load balanced across multiple instances of any server side resource.

Figure 6:
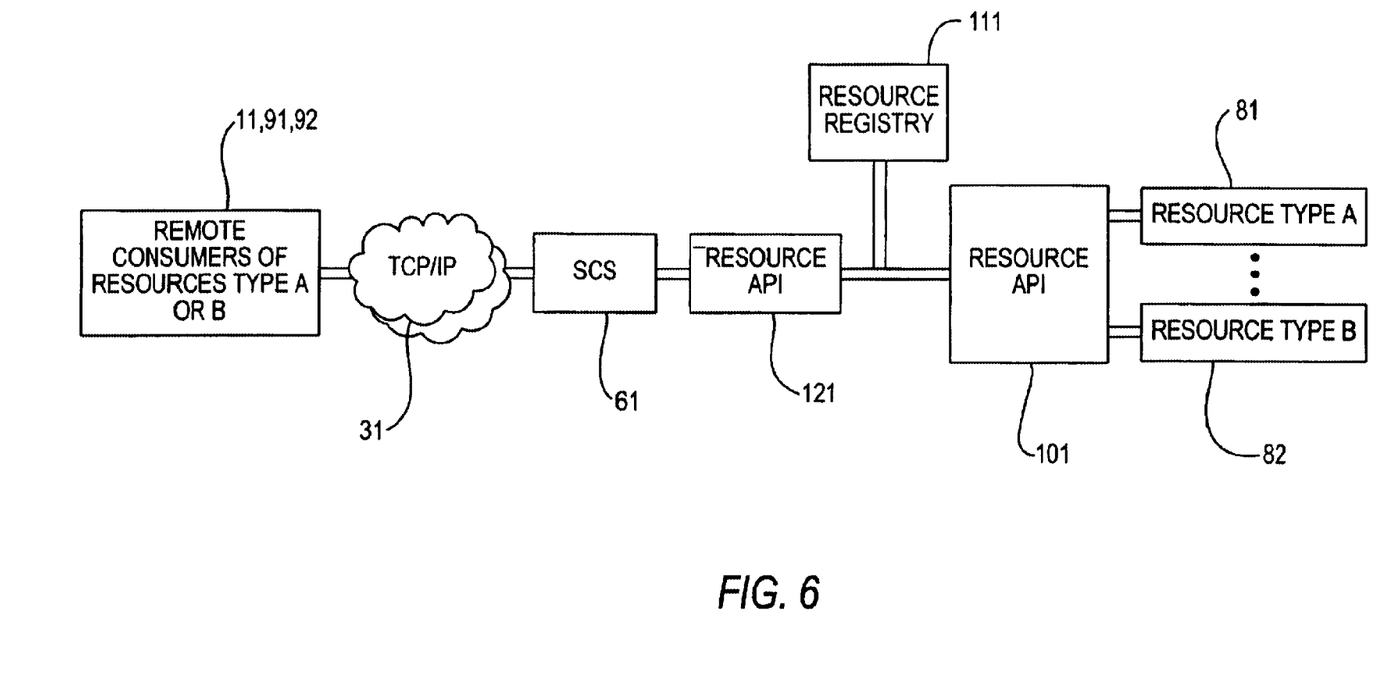
FIG. 6 is a schematic diagram of the system of the present invention configured as a proxy consumer.

Referring now to FIG. 6, there is illustrated an alternative embodiment of the present invention where the communication server is configured as a proxy consumer. Remote consumers of resources 11, 91, 92 represent remote clients seeking public resources served by resource servers 81, 82. A resource registry 111 is interposed between the resource servers 81, 82 and the communication server 61. The resource registry 111 holds a registry of available resources, and is able to monitor the availability of the resources registered within it. A resource Application Programming Interface (API) 121 is interposed between the resource registry 11 1 and the communication server 61. Another resource API 101 is interposed between the resource servers 81, 82 and the resource registry 111.

Any prospective consumers 11, 91, 92 of resources can receive the benefits of the resource by querying the resource registry 111 and receiving directions on how to access the most appropriate instance of the resource application through the resource API. New resources and consumers can be added via a software library that enables the registering and consuming of resource services.

The process of registering a resource server 81, 82 is achieved as follows. The initialization file of each application contains the location and communication options associated with one or more resource registries 111. On startup an application that wishes to expose a resource registers it by name with the resource registries 111. The registration includes information that forms a "handle" to that resource such as communication details, location, maximum number of connections that can be supported simultaneously, etc. There is no automatic method by which resource registries become known to resources. Resources are entirely reliant on correct configuration within the initialization file to be able to locate a resource registry. Resource to registry connections have a configurable heartbeat period to monitor the quality of the link. If disconnection of the resource from a resource registry occurs then the link is auto retried on a configurable interval until reconnection is achieved. Having registered with a resource registry, the resource waits for notifications that a consumer wishes to connect to it. On receiving new consumer connections the resource is required to provide the service which it advertised.

It should be noted that a resource can be running on any machine that has TCP/IP communication with a resource registry. Each resource maintains an open communication stream with each of the resource registries that it has registered with. The resource registry immediately becomes aware if a resource becomes unavailable and will remove that resource's registration so that no further consumer requests are forwarded to it. Under these circumstances the communication server might receive a request for a particular resource by name from a remote consumer.

For example, in a financial trading system, a consumer associated with a remote trader applet that incorporates client side asynchronous hypertext messaging may request a resource known as a deal server. The means by which this request is satisfied might be implemented as follows. The applet connects to the communication server and requests a deal server resource. The communication server asks one of the available resource registries for a handle to the most appropriate available deal server resource. If that resource registry does not know of an available resource of type deal server then the communication server will move on to another resource registry and repeat the request. Given that a handle of an available deal server is returned to the communication server by a resource registry, then the communication server attempts to make a direct connection to that resource. However, if the communication server cannot make a direct connection to that resource, it returns to asking connected resource registries for other instances of the deal server resource. Having established a connection with an instance of the deal server resource, the communication server relays communications between the remote consumer applet and the resource.

It should be noted that further to the above description, a practical implementation of utilizing the communication server as a proxy consumer would generally include local caching of resource registry details to improve real time performance.

It should be noted that in high availability environments it would normally be necessary for multiple instances of communication servers to be available to support client connections. To enable this it is required that a third party IP load balancing Solution is logically positioned in front of the communication server instances. Such solutions are generally required to support any high availability web site installation and are designed to make instances of the site on different machines to be perceived to the outside world as all existing on a single machine with a single IP address. This is achieved by IP address translation. In addition the IP load balancer needs to keep track of sessions initiated by specific clients and ensure that once a session is started that packets received in that session continue to be forwarded to the same SCS instance. This is also standard practice for secure web site installations and is generally based upon a timeout scheme associated with packets from each source IP address. As noted above, communication server communications can include an scsID that is unique to a given communication server. This can be used to ensure that the session awareness of an IP load balancing solution is operating correctly.

Although the present invention is described in various illustrative embodiments, it is not intended to limit the invention to the precise embodiments disclosed herein. Accordingly, this description is to be construed as illustrative only. Those who are skilled in this technology can make various alterations and modifications without departing from the scope and spirit of this invention. Therefore, the scope of the present invention shall be defined and protected by the following claims and their equivalents. The exclusive use of all modifications within the scope of the claims is reserved.

APPENDIX A

When bMUX > 0 this method builds the response header for refresh requests.
When bMUX = 0 the method produces the AHM server acknowledgment response to an HTTP message that was sent by the AHM client to encapsulate data that was sent from client to server.
CONTENT_LENGTH is a constant that would be set to a number greater than could ever be expected to be sent from server to client within a four minute time frame. Generally, this constant could be set to a number on the order of 10 megabytes.
void CTunnelSocketManager::SendResponseHeader(IFC_IStream *urlSock, int bMUX)

APPENDIX A-continued

```
{
    IFC_CString response;
    if(m_iDelayMSecs)IFC_Sleep(m_iDelayMSecs);
    response =   "HTTP/1.0 200 OK\r\n"
            "Server: IDealRelay\r\n";
    time_t timeNow;
    struct tm tml;
    char buffer[40];
    time(&timeNow)
    IFC_LocalTime(&timeNow, &tml);
    strftime(buffer, 40, "%a, %d %b %Y %H:%M:%S\r\n",&tml);
    response += "Date: ";
    response += buffer;
    if (bMUX)
    {
        response += "Content-length: ";
        response += CONTENT_LENGTH;
        response += "\r\nConnection: close\r\n"
                "Content-type: text/plain\r\n\r\n";
    }
    else
    {
        response += "Connection: Keep-Alive\r\n"
                "Content-length: 7\r\n"
                "Content-type: text/plain\r\n\r\n"
                "hello\r\n";
    }
    urlsock->BlockingSend((void *) ((const char *)response),strlen(response));
}
```

What is claimed is:

1. A method of transmitting asynchronous hypertext messages from a server to a client interconnected by an internet, said method comprising the steps of:

transmitting a HTTP request identifying said client from said client to said server;

initiating a virtual connection from said server to said client wherein said server transmits a HTTP header signifying a large HTML document; and transmitting asynchronous hypertext messages encoded in said HTML document from said server to said client via said virtual connection;

wherein said virtual connection is maintained by periodically refreshing said HTML document at said client.

2. The method in accordance with claim 1, further comprising the step of transmitting asynchronous hypertext messages from said client to said server via said virtual connection.

3. The method in accordance with claim 1, wherein said first step of transmitting said HTTP request identifying said client is transmitted via secure socket layer protocol.

4. The method in accordance with claim 1, wherein said step of initiating said virtual connection is performed by a TCP/IP socket based application programming interface residing on said server.

5. The method in accordance with claim 4, wherein said step of initiating said virtual connection is performed by a TCP/IP java applet residing on said client.

6. The method in accordance with claim 1, wherein said request further comprises a transmitted key.

7. The method in accordance with claim 6, wherein said transmitted key is a public key.

8. The method in accordance with claim 6, wherein said transmitted key is a private encryption key.

9. The method in accordance with claim 1, wherein said client is a java applet.

10. The method in accordance with claim 1, wherein said server is a communication server.

11. The method in accordance with claim 10, wherein said communication server is further connected to a resource server.

12. The method in accordance with claim 10 wherein said resource server supplies stock prices.

13. The method in accordance with claim 10 wherein said resource server supplies foreign exchange quotes.

14. The method in accordance with claim 1 wherein multiple asynchronous hypertext messages are multiplexed into said virtual channel.

15. The method in accordance with claim 1, further comprising the step of transmitting a heartbeat message from said server to said client at predefined intervals.

16. The method in accordance with claim 1, wherein the step of transmitting asynchronous hypertext messages is duplicated to produce multiple copies of the same message.

17. The method in accordance with claim 1, wherein said virtual connection is monitored for delays.

18. The method in accordance with claim 17, wherein an optimal virtual connection is found based upon said delays.

* * * * *